Feb. 1, 1949.    P. J. CADE    2,460,277
ELECTRONIC TIMING DEVICE
Filed Nov. 1, 1946
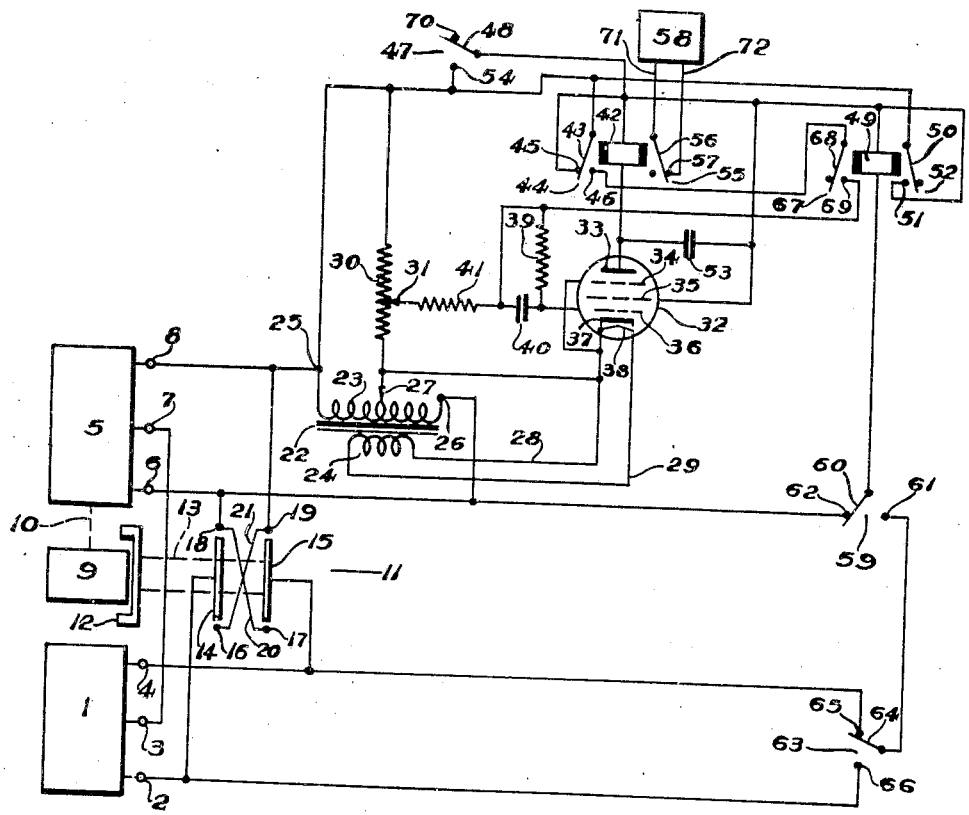
PHILLIP J. CADE
By James C. Hamilton
Attorney

UNITED STATES PATENT OFFICE 2,460,277

ELECTRONIC TIMING DEVICE

Phillip J. Cade, Sharon, Mass., assignor to Photoswitch, Incorporated, Cambridge, Mass., a corporation of Massachusetts Application November 1, 1946, Serial No. 707,167

7 Claims. (Cl. 318—283)

The present invention relates to electronic control apparatus for performing a timed operation upon the completion of a work cycle of a machine tool, as for example, the controlling of the automatic cross feed of an oscillating work table under a cutter in a milling machine each time the work table completes a stroke.

In milling and grinding machines, using oscillating work tables, it is necessary to reverse the motor driving the work table at the end of each stroke and to operate the cross feed at the end of each stroke or at the end of alternate strokes to move the work table to a new operating position under the cutters or grinding wheel. Preferably, the cross feed should operate a predetermined amount or distance at each feeding operation, in order that successive cuts may be uniform. Accordingly, an automatic feed mechanism is generally employed, which operates the cross feed under control of the motor of the work table.

Previously, it has been the general practice in respect to such automatic feed controls to use mechanical methods and timing devices to control the operation of the cross feed at the end of each stroke of the work table. Such mechanical apparatus is subject to wear, and needs continual adjustment. It is also usually complicated and difficult to construct in a vibration-proof manner.

The main object of the invention is to provide a novel control device to initiate and time a controlled operation at the end of each stroke of a work table of a machine tool.

It is another object of the invention to provide an electronic timing control device for the above purpose which is organized especially with a view to simplicity of construction, accuracy of operation, reliability, and constant readiness for operation.

Other objects are to provide a device for initiating and timing a controlled operation at the completion of alternate strokes of the work table of a machine tool; and to provide means for choosing the strokes at the end of which the controlled operation is initiated and timed.

From another aspect, an object of the invention is to provide an arrangement to permit the operator to choose whether the controlled operation shall be performed at the end of each stroke of the work table of the machine tool, or at the end of alternate strokes of the work table, and in the latter instance, to permit the further choice of the stroke at the end of which the controlled operation shall occur.

From still another aspect of the invention, an object of the invention is to provide an electronic timing control device to operate for a predetermined time the motor operating the cross feed of a work table at the end of each stroke or at the end of alternate strokes of the work table.

Another object is to provide an automatic control to perform an operation for a predetermined period each time a moving member of a machine reaches one or two fixed positions on the path followed by such moving member.

These and other objects, aspects and features of the invention will be apparent from the following description of an illustrative embodiment thereof, referring to the drawing which is a diagram in electrical scheme of an arrangement according to the invention.

In the drawing, a power source 1 supplies three phase alternating current to terminals 2, 3, and 4, one phase being supplied by terminals 2 and 4, another by terminals 2 and 3, and the third by terminals 3 and 4. A three phase motor 5 is provided with terminals 6, 7 and 8 and actuates a work table 9 through mechanical power linkage 10 (represented by a dotted line). A motor reversing switch 11 is provided to be actuated by the work table and is composed of an actuator bar 12, with an insulated mechanical linkage 13 holding two electrical switch bars 14 and 15 and four electrical contacts 16, 17, 18 and 19, with contacts 17 and 18 and 16 and 19 connected together by wires 20 and 21 respectively.

Terminal 3 of the source 1 is connected to terminal 7 of the motor 5, and terminals 2 and 4 of the source 1 are connected to switch bars 14 and 15 respectively, switch contacts 18 and 19 are connected to terminals 6 and 8 respectively of the motor 5.

A power transformer 22 having a center-tapped primary winding 23 with end terminals 25 and 26 and an intermediate tap 27 and a secondary winding 24 supplying the current to a pair of wires 28 and 29, is connected at the primary and terminals 25 and 26 to motor terminals 8 and 6 respectively. A potentiometer 30 with a movable tap 31 is connected between terminals 25 and 27 of the primary.

An electron discharge tube 32 having an anode 33, a suppressor grid 34, a screen grid 35, a control grid 36, a cathode 37 and a heater 38, is energized from the potentiometer 30, the heater 38 is supplied by wires 28 and 29 from the secondary winding 24 of the transformer 22. The suppressor grid 34, the cathode 37, and wire 28 are connected together to the intermediate tap 27 of the primary 23 of transformer 22, and hence to one end of the potentiometer 30. The control grid 36 is connected through a charge-storing capacitor 40 and a resistor 41 in series to the movable tap 31 of the potentiometer 30. A resistor 39 is connected in parallel with the capacitor 40. The anode 33 is connected to one terminal of a first electromagnetic relay 42, the other terminal of which is connected to the normally closed contact point 45 of a first single-pole double-throw relay switch 44. The switch blade 48 of a first-hand-operated control switch 47 is connected to one terminal of a second electromagnetic relay 49, and to a contact 51 of a first single-pole, single-throw relay switch 50, operated by the second relay 49. A smoothing capacitor 53 is connected across the terminals of the first relay 42. The screen grid 35 is connected also to the other terminal of the first relay 42.

Relay switch 44 has its normally closed contact point 45 connected as mentioned above, its armature 43 connected to motor terminal 8, and its normally open contact point 46 connected to the armature 68 of a second single-pole single-throw relay switch 67 which is also actuated by the second relay 49. This second single-pole, single-throw switch 67 has a switch contact 69 that is connected to the junction between the two resistors 41 and 39 in the control grid circuit.

A third single-pole single-throw relay switch 55 is actuated by the first electromagnetic relay 42 and has a switch armature 56 and a contact 57 which are connected by wires 71 and 72 to a block 58, which may represent a motor and its power source for performing a controlled operation such as the cross feed of a work table of a milling or grinding machine.

The first single-pole single-throw relay switch 50 has a contact 51, connected as set forth above, and an armature 52 which is connected to terminal 8 of motor 5.

A second hand-operated control switch 59 and the first hand-operated switch 47 may be components of a double-pole double-throw switch. The second control switch 59, used as a single-pole double-throw switch, has a switch blade 60 which is connected to the remaining and free side of the second relay 49, and two contacts 62 and 61, one contact 62 being connected to motor terminal 6, and the other contact 61 to the switch blade 64 of a third hand-operated control switch 63, a single-pole, double-throw switch. The first control switch 47 has a switch blade 48 connected, as mentioned above, to one side of both relays 42 and 49, and a contact 54 connected to terminal 8 of motor 5. When control switches 47 and 59 are components of a double-pole double-throw switch, the blade 48 of the first control switch 47 is closed on its contact 54 when the blade 60 of the second switch 59 is closed on its right hand contact 61.

The third control switch 63 has the aforementioned switch blade 64, and two switch contacts 65 and 66, connected to terminals 4 and 2 respectively of the power source 1.

For operation of the invention to control double end feed of an oscillatory work table, two of the hand-operated control switches 47 and 59 are preset, so that the first control switch 47 is open, and the blade 60 of the second control switch 59 is closed on the left-hand contact 62. The setting of the third hand-operated switch 63 is immaterial in this mode of operation. Initially, it may be assumed that the switch bars 13 and 15 of the reversing switch 11 are closed on contacts 18 and 19 respectively, and current is being furnished by the power source terminals 2 and 4 to the timing circuit.

Prior to the furnishing of power, the electromagnetic relays 42 and 49 are deenergized, and the first hand-operated switch 47 is open. The first single-pole single-throw relay switch 50 is open, and the third single-pole single-throw relay switch 55 is closed, and the blade 43 of the single-pole double-throw relay switch 44 is closed on contact 45. When the power is applied current flows through circuit, 2—14—18—62—60—49—45—43—25—19—15—4, and the second electromagnetic relay 49 is energized, closing the first and second single-pole single-throw switches 50 and 67. The first single-pole single-throw switch 50 is connected in parallel with the circuit including the switch blade 43 and contact 45 of switch 44 and maintains the second relay 49 energized through the circuit 2—14—18—62—60—49—51—52—25—19—15—4. The discharge tube 32 is energized through the circuit 2—14—18—26—27—37—33—42—45—43—25—19—15—4 or after closing of the first single-pole single-throw switch 50, the circuit, 2—14—18—26—27—37—33—42—51—52—25—19—15—4, thus actuating the armature 43 of the single-pole double-throw switch causing it to break its contact with contact 45 and to close on the other contact 46, and opening the third single-pole single-throw switch 55.

The timing capacitor 40 becomes charged through the circuit 2—14—18—26—27—37—36—40—69—68—46—43—25—19—15—4.

When the work table 9 reaches the opposite end of its stroke it hits the switch actuator 12 breaking the contacts between switch bars 14 and 15 with switch contacts 18 and 19, respectively. Consequently, the first relay magnet 49 and electron tube 32 are momentarily deenergized, the single-pole single-throw switches 50 and 67 are opened. But, the smoothing capacitor 53 acts as a source of voltage to maintain the first electromagnetic relay 42 energized so that the position of the third single-pole single-throw switch 55 and the single-pole double-throw switch remain unchanged.

The switch actuator 12 is moved by the work table until it causes the connecting bars 14 and 15 to make contact with the opposite pair of contacts 16 and 17 respectively, thus reversing the connections between the source terminals 2 and 4 and the motor terminals 6 and 8 so as to reverse the three phase motor 5. But since the first single-pole single-throw switch 50 and the contact between the blade 43 and contact 45 of the single-pole double-throw switch 44 are both open, no power is furnished to the discharge tube 32 or the second relay 49.

By this time, due to the dissipation of the charge in the smoothing capacitor 53 through the first relay 42, that capacitor 53 no longer holds the first relay 42 energized. As a consequence, the third single-pole single-throw relay switch 55 closes, initiating the timed operation and the switch blade 43 of the single-pole double-throw relay switch 44 breaks contact with contact 46 and makes contact with contact 45. The timing capacitor 40 has been charged so as to put a negative charge on the control grid 36 of the discharge tube 32. The opening of the second single-pole single-throw switch 67 and breaking of contact by switch 44 between the switch blade 43 and contact 46 causes the potential on the grid 36 to be changed to a lower potential derived through the potentiometer 30 and its tap 31, which new potential, together with the negative charge accumulated on the timing capacitor 40, is sufficiently negative to cut off the discharge tube 32. In the meantime, the making of contact between the blade 43 and contact 45 of the single-pole double-throw switch 44 completes the circuit 2—14—16—19—43—45—49—60—62—18—17—15—4, energizing the second electromagnetic relay 49 which closes the first two single-pole single-throw switches 50 and 67.

The charge in the timing capacitor 40 dissipates through the parallel connected resistor 39, gradually raising the potential on the control grid 36 until the discharge tube 32 again becomes conductive, at which time the third single-pole single-throw relay switch 55 opens, ending the timed operation, and the blade 43 of the single-pole double-throw switch 44 opens its contact with contact 45 and closes on contact 46. Switch bars 14 and 15 are now in contact with contacts 16 and 17 respectively, and the motor 5 is now running in the reverse direction.

The timing capacitor 40 now recharges, and the circuit is ready for repetition of the operation upon the work table 9 reaching the opposite end of its travel and causing the switch actuator 12 to make switch bars 14 and 15 break contact with the present pair of contacts 16 and 17 respectively, and make contact with the opposite pair of contacts 18 and 19 respectively.

Thus, it is seen that each time the work table reaches the end of its stroke, the motor 5 is reversed and the third single-pole single-throw switch 55 is simultaneously closed for a timed interval as determined by the time taken for dissipation of the energy stored in the timing capacitor 40 through the parallel-connected resistor 39, and the cut-off characteristics of the electron discharge tube 32.

When it is desired to have the controlled operation occur each time the work table reaches one particular end of its oscillating path, the first hand-operated control switch 47 is set so that the blade 48 is on contact 54, and the second hand-operated switch 63 is now connected in the circuit and its blade 64 may be set so as to touch either contact 65 or 66, depending upon which end of the oscillating path of the work table it is desired to have control the operation. In the figure explaining the operation, the switch blade 64 is thrown on contact 66.

At the start of the operating cycle, the switch bars 14 and 15 of the reversing switch 11 are closed on the upper pair of switch contacts 18 and 19 respectively, the relay operated switch blades 43, 68 and 52 are closed on contacts 46, 69 and 51 respectively, and the remaining relay-operated switch 55 is open. The relay 49 is energized through circuit, 2—66—64—61—60—49—48—54—25—19—15—4, and the electron discharge tube 32 is conducting, and the first relay 42 is energized through circuit, 4—15—19—25—54—48—42—33—37—27—26—18—14—2. The timing capacitor 40 is charged as before on alternate half cycles.

Now, upon the work table 9 reaching the lower end of its stroke, the switch bars 14 and 15 of the reversing switch 11 are disconnected momentarily from the upper points 18 and 19 breaking the circuit, 2—66—64—61—60—49—48—54—25—19—15—4, deenergizing the second relay 49, opening the contact between the armature 69 and contacts 68 of the second single-pole single-throw switch. The first single-pole single-throw switch 50 is also opened, but the operation of this switch is not important in this mode of operation, since it is short-circuited by the closed single-pole single-throw hand operated switch 47. During this interruption, the first relay 42 is maintained energized by the smoothing capacitor 53, so that the associated relay switches 44 and 55 are unaffected.

With certain choices of values for the smoothing capacitor 53, the first relay 42 may become deenergized before the operation of the reversing switch is completed, thus closing the third single-pole single-throw switch 55, and starting the timing operation. But generally the value of the smoothing capacitor 53 is so chosen that the first relay 42 remains energized until switch bars 14 and 15 make contact with the lower pair of switch points 16 and 17 respectively, short-circuiting the second relay 49 through circuit 2—14—16—19—25—54—48—49—60—61—64—66—2, thus maintaining 49 deenergized and the second single-pole single-throw relay switch 67 open. The opening of this relay switch 67 causes the control grid 36 to become sufficiently negative in potential, because of the charge on the timing capacitor 40, to cut off the discharge tube 32, and the first relay 42 is therefore deenergized allowing the third single-pole single-throw switch 55 to close and start the controlled operation, and allowing the switch blade 43 of the single-pole double-throw switch 44 to break away from contact 46 and close on contact 45.

Depending upon the rate of dissipation of the charge in the capacitor 40 through the parallel-connected resistor 39, and the cut-off characteristics of the discharge tube 32, the tube becomes conductive at a predetermined time thereafter. The third single-pole single-throw switch 55 opens, ending the timed operation, and the switch blade of the single-pole double-throw switch 44 pulls away from contact 45 to close on contact 46. In the meantime, the second relay 49 is maintained deenergized, thereby allowing the second single-pole single-throw switch 69 to remain open, preventing the complete recharging of the timing capacitor 40.

Upon a reversal in the reversing switch 11 at the other end of the table travel, the first relay 42 is again maintained energized during the short interval by the smoothing capacitor 53 so that switch 55 is held open.

Upon completion of the reversal, the switch bars 14 and 15 of the reversing switch 11 again make contact with the upper pair of switch points 18 and 19 respectively, energizing the second relay 49 through the circuit 2—66—64—61—60—49—48—54—25—19—15—4, thereby closing the second single-pole single-throw switch 67 recharging the timing capacitor 40 through the circuit, 4—15—19—43—46—69—68—40—36—37—18—14—2, and the circuit is now ready for the next cyclic operation.

Thus, the above-described mode of operation institutes the timed operation when the work table reaches one end of its oscillatory path. By changing the position of the third hand-operated control switch 63, the end at which such operation is initiated may be chosen since the position of switch 63 determines whether relay 49 will be short-circuited when the switch bars 14 and 15 are in contact with the lower pair of switch contacts 16 and 17 respectively or in contact with upper pair of switch contacts 18 and 19 respectively.

It will, of course, be evident to one skilled in the art that the apparatus may be used in connection with any machine having an oscillating element where it is desired to initiate a timed operation each time the oscillating element reaches one point or each of two points on the oscillator path of the oscillating element.

It will also be evident to one skilled in the art that the operation of the invention is not limited to use with a three phase source and a three phase reversible motor, but that the device may be used with suitable modifications familiar to those skilled in the art with any type of alternating current motor and its appropriate source, which is capable of being reversed by the reversal of connections to two terminals.

Since certain changes may be made in the above-described article and different embodiments of the invention could be made without departing from the scope thereof, it is intended that all matter contained in the above description or shown in the accompanying drawing shall be interpreted as illustrative only and not in a limiting sense.

What is claimed:

1. An electronic timer, suitable for timing the operations of a machine having an oscillatory member driven by a reversible motor, which comprises: first and second source terminals connected to a source of electric power; first and second motor terminals connected to said motor; a reversing switch, actuated by said member and adapted to make and maintain connections between said source and motor terminals and to reverse said connections upon said member reaching either of its extreme positions; a voltage divider connected across said motor terminals; an electron discharge device having at least an anode, cathode, and a control electrode, said cathode being connected to said first motor terminal; an energy storage and dissipation means connected between said control electrode and a point on said voltage divider; a first current responsive operator means, bridged by a capacitor, connected between said anode and a terminal point; a second current responsive operator means connected between said terminal point and a first hand-operated switch which is adapted to make a connection with said first motor terminal, or with a second hand-operated switch adapted to make contact to either of said source terminals; a first relay switch adapted to maintain connection between said second motor terminal and said terminal point, except when said first operator means is energized, and then to make connection between said second motor terminal and a second relay switch which is adapted to make a connection with said energy storage and dissipation means when said second operator means is energized; a third relay switch adapted to make a connection between said second motor terminal and said terminal point when said second operator means is energized; a third hand-operated switch adapted to make a connection between said second motor terminal and said terminal point; and control means actuated by said first operator means.

2. An electronic timer, suitable for timing the operations of a machine having an oscillatory member driven by a reversible motor, which comprises: first and second source terminals connected to a source of electric power; first and second motor terminals connected to said motor; a reversing switch, actuated by said member and adapted to make and maintain connections between said source and motor terminals and to reverse said connections upon said member reaching either of its extreme positions; a voltage divider connected across said motor terminals; an electron discharge device having at least an anode, cathode and a control electrode, said cathode being connected to said first motor terminal; an energy storage and dissipation means connected between said control electrode and a point on said voltage divider; a first current responsive operator means, bridged by a capacitor, connected between said anode and a terminal point; a second current responsive operator means connected between said terminal point and said first motor terminal; a first relay switch adapted to maintain a connection between said second motor terminal and said terminal point, except when said first operator means is energized, and then to make connection between said terminal point and a second relay switch which is adapted to make a connection with said energy storage and dissipation means when said second operator means is energized; a third relay switch adapted to make a connection between said second motor terminal and said terminal point when said second operator means is energized; and control means actuated by said first operator means.

3. An electronic timer, suitable for timing the operations of a machine having an oscillatory member driven by a reversible motor, which comprises: first and second source terminals connected to a source of electric power; first and second motor terminals connected to said motor; a reversing switch, actuated by said member and adapted to make and maintain connections between said source and motor terminals and to reverse said connections upon said member reaching either of its extreme positions; a voltage divider connected across said motor terminals; an electron discharge device having at least an anode, cathode and a control electrode, said cathode being connected to said first motor terminal; an energy storage and dissipation means connected between said control electrode and a point on said voltage divider; a first current responsive operator means, bridged by a capacitor, connected between said anode and said second motor terminal; a second current responsive operator means connected between said second motor terminal and a hand-operated switch which is adapted to connect to either said first or said second source terminal; a first relay switch adapted, when said first operator means is energized, to connect said motor terminal to a second relay switch means which is adapted to make a connection to said energy storage and dissipation means when said second operator means is energized; and control means actuated by said first operator means.

4. An electronic timer, suitable for timing the operation of a machine having an oscillatory member driven by a reversible motor, which comprises: first and second source terminals connected to a source of electric power; first and second motor terminals connected to said motor; a reversing switch, actuated by said member and adapted to make and maintain connections between said source and motor terminals and to reverse said connections upon said member reaching either of its extreme positions; a voltage divider connected across said motor terminals; an electron discharge device having at least an anode, cathode and a control electrode, said cathode being connected to said first motor terminal; an energy storage and dissipation means connected between said control electrode and a point on said voltage divider; a first current responsive operator means, bridged by a capacitor, connected between said anode and said second motor terminal; a second current responsive operator means connected between said motor terminal and said first source terminal; a first relay switch adapted, when said first current responsive means is energized, to connect said motor terminal to a second relay switch which is adapted to make a connection to said energy storage and dissipation means when said second operator means is energized; and control means actuated by said first operator means.

5. An electronic timer, suitable for timing the operations of a machine having an oscillatory member driven by a reversible motor, which comprises: first and second source terminals connected to a source of electric power; first and second motor terminals connected to said motor; a reversing switch, actuated by said member and adapted to make and maintain connections between said source and motor terminals and to reverse said connections upon said member reaching either of its extreme positions; a transformer, the primary of which is connected between said motor terminals, and the secondary of which is provided with an intermediate tap; a voltage divider connected between said second motor terminal and said intermediate tap; an electron discharge device having at least an anode, cathode, a control electrode, and a cathode heater, said cathode being connected to said intermediate tap, and said cathode heater being supplied by said secondary; an energy storage and dissipation means connected between said control electrode and a point on said voltage divider; a first current responsive operator means, bridged by a capacitor, connected between said anode and a terminal point; a second current responsive operator means connected between said terminal point and a first hand-operated switch which is adapted to make a connection with said first motor terminal or a second hand-operated switch adapted to make contact to either of said source terminals; a first relay switch adapted to maintain connection between said second motor terminal and said terminal point, except when said first operator means is energized, and then to make connection between said second motor terminal and a second relay switch which is adapted to make a connection with said energy storage and dissipation means when said second operator means is energized; a third relay switch adapted to make a connection between said second motor terminal and said terminal point when said second operator means is energized; a third hand-operated switch adapted to make a connection between said second motor terminal and said terminal point; and control means actuated by said first operator means.

6. An electronic timer, suitable for use with a machine having an oscillatory member, which comprises: first, second, and third switching means adapted to establish the conditions for initiating a timing operation, said first switching means establishing either a first condition for initiating the timing operation upon said member reaching each of said positions, or a second condition for initiating the timing operation upon said member reaching either said first or said second position, said second switching means establishing, if said second condition exists, either a third condition for initiating said timing operation upon said member reaching said first position or a fourth condition for initiating said timing operation upon said member reaching. said second position, and said third switching means adapted to initiate the timing operation when said member reaches the positions in accordance with the conditions established by said first and second switching means.

7. An electronic timing device for use with a machine having an oscillating work table operated by a three phase reversible motor, which comprises: first and second source terminals connected to a source of 3 phase electric power; first and second motor terminals connected to said motor; a reversing switch, actuated by said table and adapted to make and maintain connections between said source and motor terminals and to reverse said connections upon said table reaching either of its extreme positions; a voltage divider connected across said motor terminals; an electron discharge device having at least an anode, cathode, and a control electrode, said cathode being connected to said first motor terminal; an energy storage and dissipation means connected between said control electrode and a point on said voltage divider; a first current responsive operator means, bridged by a capacitor, connected between said anode and a terminal point; a second current responsive operator means connected between said terminal point and a first hand-operated switch adapted to make connection with said first motor terminal or with a second hand-operated switch to make contact to either of said source terminals; a first relay switch adapted to maintain connection between said second motor terminal and said terminal point, except when said first operator means is energized, and then to make connections between said second motor terminal and a second relay switch adapted to make a connection with said energy storage and dissipation means when said second operator means is energized; a third relay switch adapted to make a connection between said second motor terminal and said terminal point when said second operator means is energized; a third hand-operated switch adapted to make a connection between said second motor terminal and said terminal point; and control means actuated by said first operator means.

PHILLIP J. CADE.

REFERENCES CITED

The following references are of record in the file of this patent:

UNITED STATES PATENTS

| Number | Name | Date |
| --- | --- | --- |
| 2,069,493 | Howe | Feb. 2, 1937 |